(12) United States Patent
Liao et al.

(10) Patent No.: US 11,334,214 B2
(45) Date of Patent: May 17, 2022

(54) METHOD AND APPARATUS FOR CONTROLLING OBJECT IN VIRTUAL SCENE

(71) Applicant: TENCENT TECHNOLOGY (SHENZHEN) COMPANY LIMITED, Shenzhen (CN)

(72) Inventors: Lei Liao, Shenzhen (CN); Lin Wang, Shenzhen (CN); Shangli Liang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 46 days.

(21) Appl. No.: 16/906,575

(22) Filed: Jun. 19, 2020

(65) Prior Publication Data

US 2020/0319771 A1 Oct. 8, 2020

Related U.S. Application Data

(63) Continuation of application No. PCT/CN2019/078862, filed on Mar. 20, 2019.

(30) Foreign Application Priority Data

Mar. 30, 2018 (CN) .......................... 201810276798.0

(51) Int. Cl.
*G06F 3/04815* (2022.01)
*G06F 3/04845* (2022.01)
(Continued)

(52) U.S. Cl.
CPC ........ *G06F 3/04815* (2013.01); *A63F 13/426* (2014.09); *A63F 13/5372* (2014.09);
(Continued)

(58) Field of Classification Search
CPC ............. G06F 3/04815; G06F 3/04845; G06F 3/0488; G06F 2203/04802;
(Continued)

(56) References Cited

U.S. PATENT DOCUMENTS 10,946,282 B2 * 3/2021 Zou ........................ A63F 13/577
2007/0026944 A1 * 2/2007 Maehiro ................ A63F 13/822
463/31

(Continued)

FOREIGN PATENT DOCUMENTS

CN 1279798 A 1/2001
CN 101668571 A 3/2010
(Continued)

OTHER PUBLICATIONS

International Search Report dated May 30, 2019 in PCT/CN2019/078862, with English translation.
(Continued)

*Primary Examiner* — Tadesse Hailu
*Assistant Examiner* — Alvaro R Calderon, IV
(74) *Attorney, Agent, or Firm* — Crowell & Moring LLP

(57) ABSTRACT

This application relates to a method and an apparatus for controlling an object in a virtual scene. The method may include generating a first virtual object at a first position point outside a navigation surface in a virtual scene; determining an appearance action of the first virtual object at a second position point in the navigation surface; controlling the first virtual object to move from the first position point to the second position point; and controlling the first virtual object to perform the appearance action at the second position point. In this way, when a virtual object needs to be refreshed, the first virtual object may be generated at the first position point, the first virtual object is controlled to move to the second position point, and the appearance action is
(Continued)

performed at the second position point, thereby improving a refreshing effect of the virtual object.

9 Claims, 10 Drawing Sheets

(51) Int. Cl.
    *G06F 3/0488*     (2022.01)
    *A63F 13/5372*     (2014.01)
    *A63F 13/426*     (2014.01)
    *A63F 13/52*     (2014.01)

(52) U.S. Cl.
    CPC ........ G06F 3/0488 (2013.01); G06F 3/04845 (2013.01); *A63F 13/52* (2014.09); *A63F 2300/308* (2013.01); *G06F 2203/04801* (2013.01); *G06F 2203/04802* (2013.01)

(58) Field of Classification Search
    CPC ........... G06F 2203/04801; G06F 3/011; G06F 2203/012; A63F 13/5372; A63F 13/426; A63F 2300/308; A63F 13/52
    See application file for complete search history.

(56) References Cited

U.S. PATENT DOCUMENTS

| | | | | |
|---|---|---|---|---|
| 2007/0155501 | A1* | 7/2007 | Kanemori | A63F 13/5372 463/37 |
| 2009/0102975 | A1* | 4/2009 | Arai | A63F 13/52 348/589 |
| 2010/0113147 | A1* | 5/2010 | Chosogabe | A63F 13/53 463/30 |
| 2010/0292008 | A1* | 11/2010 | Matsumura | A63F 13/10 463/36 |
| 2011/0201423 | A1* | 8/2011 | Borst | A63F 13/358 463/31 |
| 2011/0205243 | A1* | 8/2011 | Matsuda | G06F 3/04815 345/633 |
| 2012/0058829 | A1* | 3/2012 | Yanagisawa | A63F 13/812 463/43 |
| 2014/0120993 | A1* | 5/2014 | Tsuchiya | A63F 13/10 463/4 |
| 2014/0329600 | A1* | 11/2014 | Fujioka | A63F 13/533 463/31 |
| 2014/0375560 | A1* | 12/2014 | Masuda | G06F 3/04815 345/157 |
| 2016/0101363 | A1* | 4/2016 | Zou | A63F 13/87 463/42 |
| 2016/0179336 | A1* | 6/2016 | Ambrus | G02B 27/017 715/768 |
| 2016/0253842 | A1* | 9/2016 | Shapira | G06F 3/017 345/633 |
| 2018/0321817 | A1* | 11/2018 | Terahata | A63F 13/213 |
| 2019/0020809 | A1* | 1/2019 | Pan | G06K 9/00671 |
| 2019/0172265 | A1* | 6/2019 | Cossairt | A63F 13/213 |
| 2019/0310712 | A1* | 10/2019 | Ara Jo | G06F 3/016 |
| 2019/0324277 | A1* | 10/2019 | Kohler | G06F 3/011 |
| 2021/0287440 | A1* | 9/2021 | Wang | G06F 3/011 |

FOREIGN PATENT DOCUMENTS

| | | |
|---|---|---|
| CN | 107132917 A | 9/2017 |
| CN | 107583271 A | 1/2018 |
| CN | 108536295 A | 9/2018 |
| JP | 2010-068872 A | 4/2010 |

OTHER PUBLICATIONS

Office Action issued on Chinese Patent Application 2018102767980, dated Nov. 10, 2020, 7 pages.

* cited by examiner

METHOD AND APPARATUS FOR CONTROLLING OBJECT IN VIRTUAL SCENE

RELATED APPLICATION

This application is a continuation application of PCT Patent Application No. PCT/CN2019/078862, filed on Mar. 20, 2019, which claims priority to Chinese Patent Application No. 201810276798.0, entitled "METHOD AND APPARATUS FOR CONTROLLING OBJECT IN VIRTUAL SCENE, ANT) COMPUTER DEVICE" filed with the China National Intellectual Property Administration on Mar. 30, 2018, wherein the entirety of each of the above-referenced applications is incorporated herein by reference.

FIELD OF THE TECHNOLOGY

This application relates to the field of computer application technologies, and in particular, to a method and an apparatus for controlling an object in a virtual scene, and a computer device.

BACKGROUND OF THE DISCLOSURE

In many application programs in which virtual scenes are built (for example, virtual reality application programs, 3D map programs, military simulation programs, first-person shooter games, and multiplayer online battle arena games), refreshing and displaying virtual objects is a common function.

In the related art, in an application program in which virtual scenes are built, each position point in a virtual scene and a correspondence between virtual objects generated at each position point are pre-configured. When a virtual object needs to be refreshed at a certain position point in the virtual scene, a terminal that runs the application program may generate and display a corresponding virtual object at the position point in the virtual scene.

SUMMARY

Embodiments of this application provide a method and an apparatus for controlling an object in a virtual scene, and a computer device, to resolve a problem of a poor display effect when a virtual object is controlled in the related art. The technical solutions are as follows.

An embodiment of this application provides a method for controlling an object in a virtual scene. The method may include generating a first virtual object at a first position point in a virtual scene. The first position point is located outside a navigation surface of the first virtual object in the virtual scene, and the navigation surface is a way-finding surface on which the first virtual object moves to a position of a user-controlled object in the virtual scene. The method may further include determining an appearance action of the first virtual object at a second position point. The second position point is located in the navigation surface. The method may further include controlling the first virtual object to move from the first position point to the second position point, and controlling the first virtual object to perform the appearance action at the second position point.

An embodiment of this application provides an apparatus for controlling an object in a virtual scene. The apparatus may include a memory operable to store program code and a processor operable to read the program code and perform a plurality of operations including generating a first virtual object at a first position point in a virtual scene, the first position point being located outside a navigation surface of the first virtual object in the virtual scene, and the navigation surface being a way-finding surface on which the first virtual object moves to a position of a user-controlled object in the virtual scene; determining an appearance action of the first virtual object at a second position point, the second position point being located in the navigation surface; controlling the first virtual object to move from the first position point to the second position point; and controlling the first virtual object to perform the appearance action at the second position point.

An embodiment of this application provides a product. The product may include machine-readable media other than a transitory signal, and instructions stored on the machine-readable media. The instructions are configured to, when executed, cause a machine to generate a first virtual object at a first position point in a virtual scene, the first position point being located outside a navigation surface of the first virtual object in the virtual scene, and the navigation surface being a way-finding surface on which the first virtual object moves to a position of a user-controlled object in the virtual scene; determine an appearance action of the first virtual object at a second position point, the second position point being located in the navigation surface; control the first virtual object to move from the first position point to the second position point; and control the first virtual object to perform the appearance action at the second position point.

It is to be understood that the foregoing general descriptions and the following detailed descriptions are merely exemplary and explanatory, and cannot limit this applications.

BRIEF DESCRIPTION OF THE DRAWINGS

The accompanying drawings herein are incorporated into and form a part of the specification, illustrate embodiments consistent with this application, and are used to explain the principles of this application together with the specification.

DESCRIPTION OF EMBODIMENTS

Exemplary embodiments are described in detail herein, and examples thereof are shown in the accompanying drawings. When the following descriptions relate to the accompanying drawings, unless otherwise indicated, same numbers in different accompanying drawings represent same or similar elements. The following implementations described in the exemplary embodiments do not represent all implementations that are consistent with this application. On the contrary, the implementations are merely examples of apparatuses and methods that are described in detail in the appended claims and that are consistent with some aspects of this application.

A virtual scene refers to a virtual scene environment generated by a computer, which can provide a multimedia virtual world. A user may control an operable virtual object in a virtual scene through an operating device or an operation interface, to observe objects, characters, and sceneries in the virtual scene from a viewing angle of the virtual object, or interact with objects, characters, sceneries, or other virtual objects in the virtual scene through the virtual object, for example, attack a target enemy by operating a virtual soldier.

The virtual scene is usually generated by an application program in a computer device such as a terminal and is displayed based on hardware (for example, a screen) the terminal. The terminal may be a mobile terminal such as a smartphone, a tablet computer, or an eBook reader. Alternatively, the terminal may be a personal computer device such as a notebook computer or a stationary computer.

For a refresh operation of the virtual object in the virtual scene, in some instances, the virtual object is refreshed after being generated at a corresponding position point, and a process of refreshing the virtual object is abrupt and blunt, which affects a display effect when the virtual object is controlled.

Figure 1A:
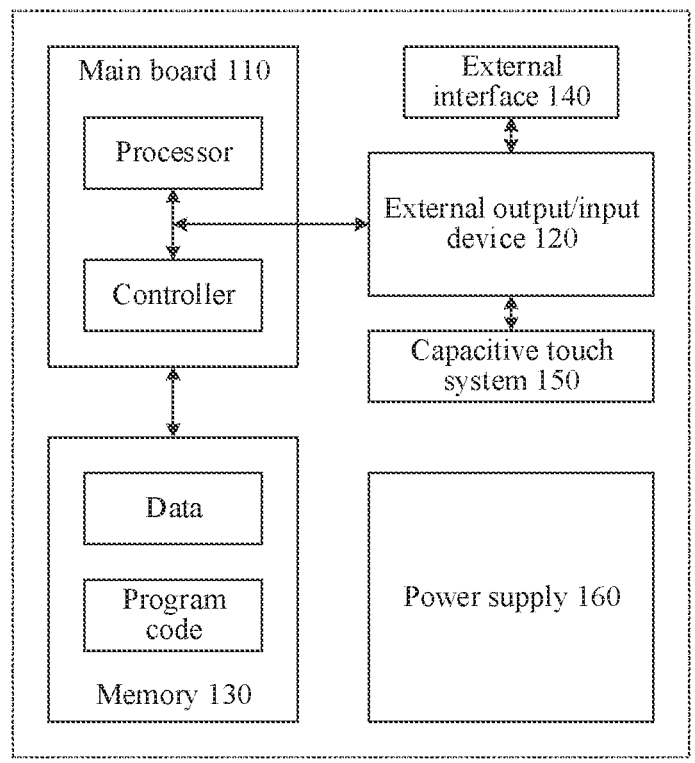
FIG. 1A is a schematic structural diagram of a terminal according to an exemplary embodiment of this application.

To resolve the foregoing technical problems, this application provides a method and an apparatus for controlling an object in a virtual scene, a computer device, and a storage medium. FIG. 1A is a schematic structural diagram of a terminal according to an exemplary embodiment of this application. As shown in FIG. 1A, the terminal includes a main board 110, an external output/input device 120, a memory 130, an external interface 140, a capacitive touch system 150, and a power supply 160.

The main board 110 integrates processing elements such as a processor and a controller.

The external output/input device 120 may include a display component (for example, a display screen), a sound playback component (for example, a speaker), a sound collection component (for example, a microphone), and various types of buttons.

The memory 130 stores program code and data.

The external interface 140 may include a headphone interface, a charging interface, a data interface, and the like.

The capacitive touch system 150 may be integrated into the display component or the button of the external output/input device 120. The capacitive touch system 150 is configured to detect a touch operation performed by a user on the display component or the button.

The power supply 160 is configured to supply power to other various components in the terminal.

In the embodiments of this application, the processor in the main board 110 may generate a virtual scene by executing or calling the program code and the data stored in the memory, and display the generated virtual scene through the external output/input device 120. In the process of displaying the virtual scene, the capacitive touch system 150 may be used to detect a touch operation performed by the user when the user interacts with the virtual scene.

Figure 2:
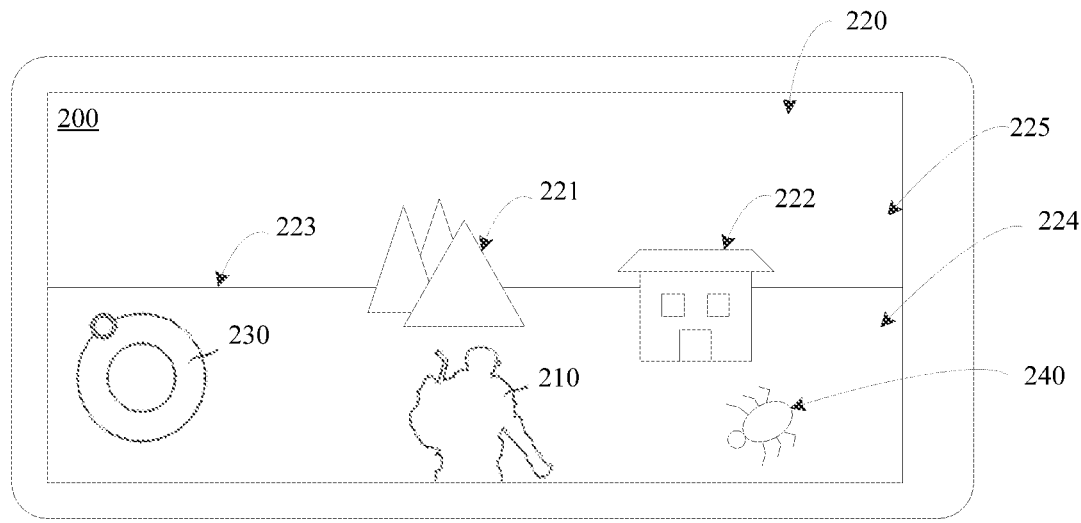
FIG. 2 is a schematic diagram of a display interface of a virtual scene according to an exemplary embodiment of this application.

The virtual scene may be a three-dimensional virtual scene, or a two-dimensional virtual scene. For example, the virtual scene is a three-dimensional virtual scene. FIG. 2 is a schematic diagram of a display interface of a virtual scene according to an exemplary embodiment of this application. As shown in FIG. 2, the display interface 200 of the virtual scene includes a virtual object 210, an environment picture 220 of the three-dimensional virtual scene, at least one set of virtual control buttons 230, and a virtual object 240. The virtual object 210 may be a user-controlled object, and the virtual control button 230 is a control element, that is, the user may manipulate the virtual object 210 through the virtual control button 230. The virtual object 240 may be a non-user-controlled object, that is, the virtual object 240 is controlled by the application program. The user may control the virtual object 210 to interact with the virtual object 240 to indirectly trigger an action of the virtual object 240.

In FIG. 2, the virtual object 210 and the virtual object 240 are three-dimensional models in the three-dimensional virtual scene, and the environment picture of the three-dimensional virtual scene displayed in the display interface 200 includes objects observed from a viewing angle of the virtual object 210. For example, as shown in FIG. 2, under the observation from the viewing angle of the virtual object 210, the displayed environment picture 220 of the three-dimensional virtual scene includes the earth 224, the sky 225, the horizon 223, a hill 221, and a factory building 222.

The virtual object 210 may be controlled by the user to move instantly. For example, the virtual control button 230 shown in FIG. 2 is a virtual button for controlling the virtual object 210 to move. When the user touches the virtual control button 230, the virtual object 210 may move in a direction of a touch point relative to a center of the virtual control button 230 in the virtual scene.

In addition, in this application, the virtual object 240 may be displayed through refreshing in the virtual scene.

Figure 1B:
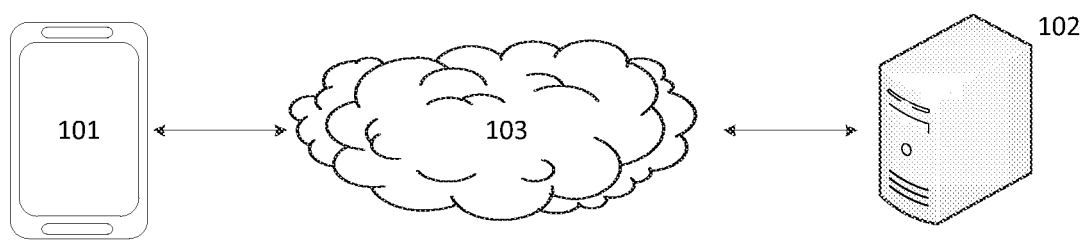
FIG. 1B is an architectural diagram of a system used in this application.

In addition, the method for controlling an object in a virtual scene provided in this application may alternatively be implemented through the interaction between a terminal device and a server. For example, in an architectural diagram of a scene shown in FIG. 1B, a terminal device 101, a server 102, and the Internet 103 are included. The terminal device 101 and the server 102 are connected through the Internet 103. The terminal device 101 receives a generation position of a virtual object in a virtual scene, a position at which an appearance action is to be performed, and the appearance action that are sent by the server 102, and then refreshes the virtual object in the virtual scene.

Figure 3:
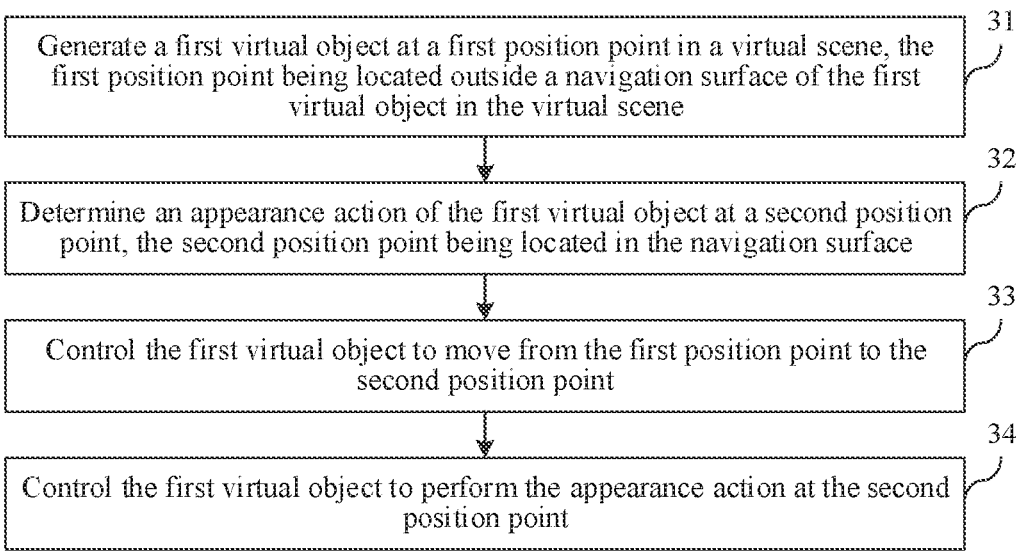
FIG. 3 is a schematic flowchart of controlling an object in a virtual scene according to an exemplary embodiment of this application.

FIG. 3 is a schematic flowchart of controlling an object in a virtual scene according to an exemplary embodiment of this application. As shown in FIG. 3, a terminal that runs an application program corresponding to the foregoing virtual scene (for example, the terminal shown in FIG. 1A) may refresh and display a first virtual object by performing the following steps.

Step 31. Generate a first virtual object at a first position point in a virtual scene, the first position point being located outside a navigation surface of the first virtual object in the virtual scene, and the navigation surface being a way-finding surface on which the first virtual object moves to a position of a user-controlled object in the virtual scene.

For example, in a game scene, assuming that the refreshed first virtual object is a hostile target that a player needs to defeat, the navigation surface may be a plane or curved surface for route searching and calculation when a monster moves in the scene area to chase for the player.

Step 32. Determine an appearance action of the first virtual object at a second position point, the second position point being located in the navigation surface.

The appearance action of the first virtual object may be a pre-configured action that matches biological features of the first virtual object and terrain features of the second position point.

Step 33. Control the first virtual object to move from the first position point to the second position point.

Step 34. Control the first virtual object to perform the appearance action at the second position point.

In this embodiment of this application, through the solution shown in FIG. 3, when a virtual object that is not controlled by a user needs to be refreshed in a virtual scene, the virtual object may be generated at a first position point outside a navigation surface of a first virtual object, and the virtual object is controlled to move to a second position point in the navigation surface, and an appearance action is performed at the second position point, so that the virtual object is refreshed more naturally and more contagiously.

Figure 4:
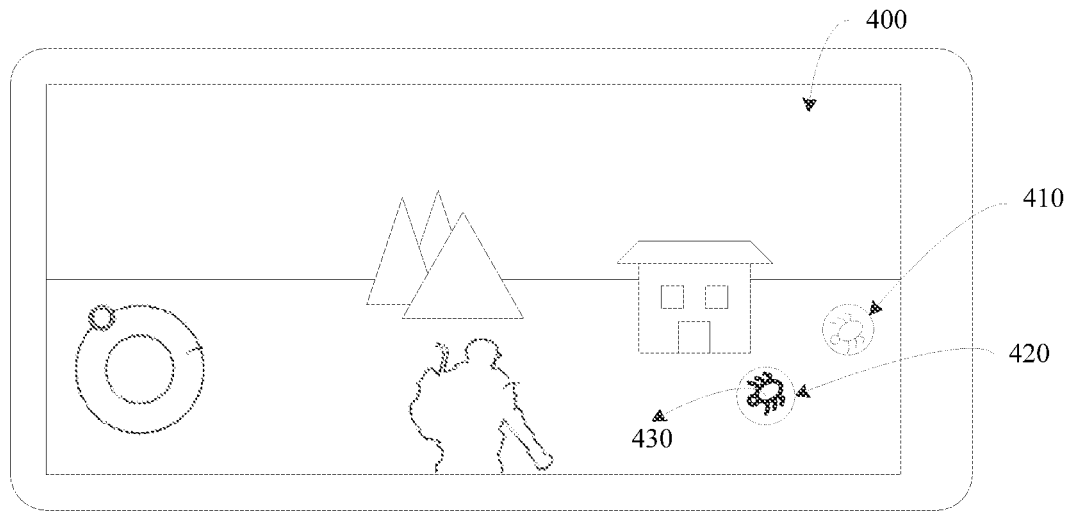
FIG. 4 is a schematic display diagram of a virtual object generation process in the embodiment shown in FIG. 3.

For example, FIG. 4 is a schematic display diagram of a virtual object generation process in an embodiment of this application. As shown in FIG. 4, a virtual scene 400 includes a first position point 410 outside a navigation surface and a second position point 420 corresponding to the first position point 410 in the navigation surface. When refreshing a virtual object, a terminal first generates a first virtual object 430 at the first position point 410 and controls the first virtual object 430 to move to the second position point 420, and then controls the first virtual object 430 to perform an appearance action of the first virtual object at the second position point.

The method for controlling an object in a virtual scene provided in this application may be implemented independently by the terminal. For example, the terminal may independently build the virtual scene, independently control each object in the virtual scene, and independently control an object control process in the virtual scene.

Figure 5:
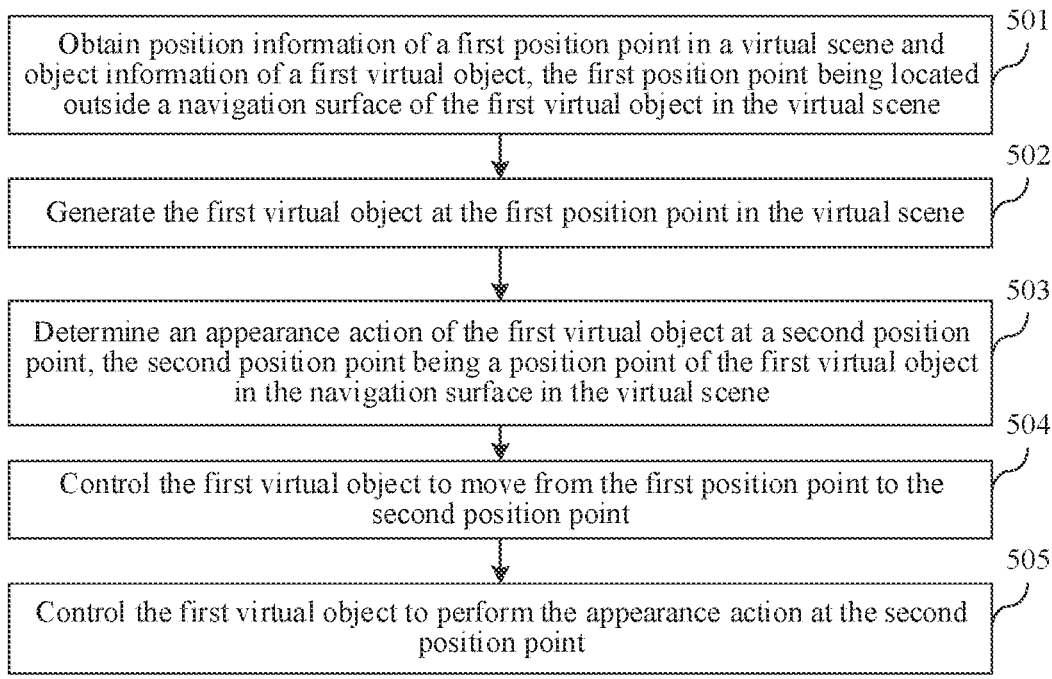
FIG. 5 is a flowchart of a method for controlling an object in a virtual scene according to an exemplary embodiment of this application.

For example, FIG. 5 is a flowchart of a method for controlling an object in a virtual scene according to an exemplary embodiment of this application. For example, the method is independently implemented by a terminal, and the method for controlling an object in a virtual scene may include the following steps:

Step 501. Obtain position information of a first position point in a virtual scene and object information of a first virtual object, the first position point being located outside a navigation surface of the first virtual object in the virtual scene.

Before generating the first virtual object at the first position point in the virtual scene, the terminal may determine the first virtual object corresponding to the virtual scene; and determine the first position point corresponding to an object type of the first virtual object.

In this embodiment of this application, several position points at which a virtual object may be generated may be pre-configured in the virtual scene, and for terrain features of each position point at which a virtual object may be generated, an object type of the virtual object that may be generated at the position point is configured. The object type may indicate biological features of the virtual object. For example, the object type may include crawling class, jumping class, walking class, and flying class. For example, Table 1 exemplarily shows a correspondence between a position point for generating a virtual object and an object type of a virtual object that may be generated.

TABLE 1

| Position point number | Object type |
| --- | --- |
| Position point A | Crawling class, walking class |
| Position point B | Jumping class |
| Position point C | Flying class |
| Position point D | Jumping class, flying class |
| . . . | . . . |

As shown in Table 1, a developer of an application program corresponding to a virtual scene pre-configures position points in the virtual scene, where virtual objects of the crawling and walking classes may be generated at the position point A, virtual objects of the jumping class may be generated at the position point B, virtual objects of the flying class may be generated at the position point C, and virtual objects of the jumping and flying classes may be generated at the position point D.

When refreshing a virtual object, the terminal may first determine object information of a first virtual object that needs to be generated in a current virtual scene, for example, an identifier of the first virtual object and an object type of the first virtual object. The terminal then determines position points in the virtual scene at which a virtual object corresponding to the object type may be generated according to the object type of the first virtual object and pre-configured information (for example, the correspondence shown in Table 1).

When determining the first position point corresponding to the object type of the virtual object, the terminal or a server may obtain a position of a second virtual object in the virtual scene, the second virtual object being a user-controlled object; determine a set of candidate positions according to the position of the second virtual object in the virtual scene, the set of candidate positions including at least one position point; and determine the first position point corresponding to the object type of the virtual object in the set of candidate positions.

In some implementations, there may be many position points for generating a virtual object of a certain object type in a virtual scene. To achieve a better refreshing effect, a set of candidate positions for refreshing the virtual object may be selected based on the position of the user-controlled object in the current virtual scene, and then the first position point corresponding to the object type of the first virtual object is determined from the set of candidate positions.

When determining the set of candidate positions according to the position of the second virtual object in the virtual scene, the terminal may add each position point that is within a preset range around the position of the second virtual object in the virtual scene and is used for generating a virtual object to the set of candidate positions.

Figure 6:
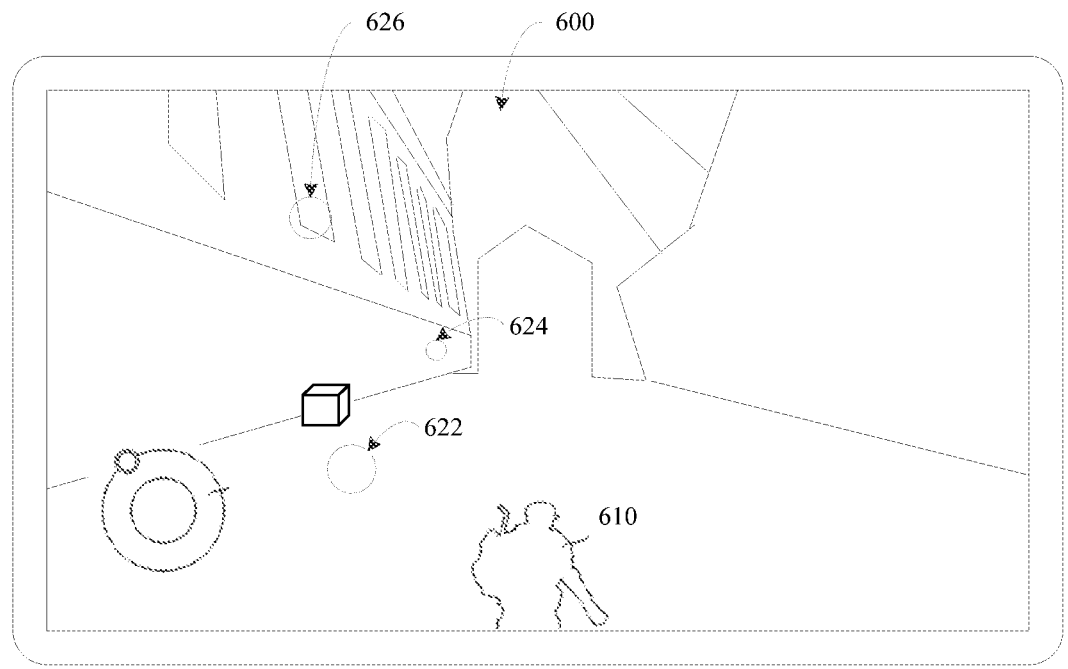
FIG. 6 is a schematic diagram of generating a position point of a virtual object in the embodiment shown in FIG. 5.

In this embodiment of this application, the terminal may add each position point that is within a preset range around the user-controlled object and is used for generating a virtual object to the set of candidate positions. For example, FIG. 6 is a schematic diagram of generating a position point of a virtual object in an embodiment of this application. In a virtual scene 600 shown in FIG. 6, a virtual object 610 is the user-controlled object that is, the foregoing second virtual object). After obtaining a position of the virtual object 610 in the virtual scene, the terminal determines that there are three position points that are within the preset range around the position of the virtual object 610 in the virtual scene and can be used for generating a virtual object (that is, a position point 622, a position point 624, and a position point 626 in FIG. 6). In this case, the terminal adds the position point 622, the position point 624, and the position point 626 to the set of candidate positions, and selects a position point that matches the object type of the to-be-generated first virtual object from the position point 622, the position point 624, and the position point 626 as the first position point. For example, assuming that an object type corresponding to the position point 622 matches the object type of the first virtual object, the terminal determines the position point 622 as the first position point.

In a case that there are two or more position points that correspond to the object type of the first virtual object in the set of candidate positions, when determining the first position point corresponding to the object type of the first virtual object from the set of candidate positions, the terminal may determine a position point closest to the second virtual object in the two or more position points as the first position point, or determine a position point farthest from the second virtual object in the two or more position points as the first position point, or determine a random one of the two or more position points as the first position point.

For example, still using FIG. 6 as an example, it is assumed that both the object type corresponding to the position point 622 and an object type corresponding to the position point 624 match the object type of the first virtual object. In this case, the terminal may determine the position point 622 which is closer to the virtual object 610 as the first position point, or determine the position point 624 which is farther from the virtual object 610 as the first position point, or randomly select one position point from the position point 622 and the position point 624 as the first position point.

In another optional implementation, before generating the first virtual object at the first position point in the virtual scene, the terminal may alternatively first determine the first position point in the virtual scene; and then determine the first virtual object corresponding to a position type of the first position point.

Different from the foregoing implementation in which the first virtual object is determined before the first position point corresponding to the first virtual object is determined, in another optional implementation, when refreshing the first virtual object, the terminal may alternatively first determine the first position point in the virtual scene, and then determine the first virtual object corresponding to an object type matching the first position point.

When determining the first position point in the virtual scene, the terminal or the server may obtain a position of a second virtual object in the virtual scene, the second virtual object being a user-controlled object; and determine the first position point according to the position of the second virtual object in the virtual scene.

For example, the terminal may select, from position points that are within a preset range around the user-controlled object and at which a virtual object may be generated, a position point closest to or farthest from the user-controlled object as the first position point, or randomly select one position point from the position points at which a virtual object may be generated as the first position point.

For example, still using FIG. 6 as an example, the terminal may determine, from the position point 622, the position point 624, and the position point 626, the position point 622 which is closer to the virtual object 610 as the first position point, or determine the position point 624 which is farther from the virtual object 610 as the first position point, or randomly select one position point from the position point 622, the position point 624, and the position point 626 as the first position point.

After determining the first position point, the terminal may query pre-configured information (for example, Table 1) according to the first position point, to determine an object type of a virtual object that may be generated at the first position point, and determine the to-be-refreshed first virtual object according to the object type.

When the virtual object that may be generated at the first position point includes two or more object types, the terminal may determine the object type corresponding to the first virtual object according to a preset priority or a refresh probability of each object type, or randomly select one of the object types as the object type corresponding to the first virtual object.

Similarly, a determined object type may alternatively correspond to two or more virtual objects. For example, virtual objects of the crawling class may include an object A in the form of an ant and an object B in the form of a spider. In this embodiment of this application, when the determined object type corresponds to two or more virtual objects, the terminal may determine one of the two or more virtual objects corresponding to the foregoing object type as the first virtual object according to a preset priority or a refresh probability of each virtual object, or randomly select one of the virtual objects as the first virtual object.

After determining the first position point and the first virtual object, the terminal may obtain position information of the first position point (for example, relative coordinates in the virtual scene) and object information of the first virtual object (for example, graphic data of the first virtual object).

Step 502. Generate the first virtual object at the first position point in the virtual scene.

After obtaining the position information of the first position point in the virtual scene and the object information of the first virtual object, the terminal may generate the first virtual object at the first position point in the virtual scene, and display the first virtual object at the first position point in the virtual scene.

Step 503. Determine an appearance action of the first virtual object at a second position point, the second position point being a position point of the first virtual object in the navigation surface in the virtual scene.

In this embodiment of this application, each position point for generating a virtual object further has its corresponding position point that is used for a generated virtual object to perform an appearance action. The position points for generating a virtual object and the position points for the virtual object to perform an appearance action may be in a one-toone correspondence, or may be in a one-to-many or many-to-many relationship. That is, one position point for generating a virtual object may correspond to a set of position points for a generated virtual object to perform an appearance action, or one position point for generating a virtual object may correspond to a plurality of sets of position points for a generated virtual object to perform an appearance action, or a plurality of position points for generating a virtual object may correspond to the same set of position points for a generated virtual object to perform an appearance action. In some cases, a position point for generating a virtual object and a corresponding position point for a generated virtual object to perform an appearance action may alternatively be the same position point.

A set of position points for a generated virtual object to perform an appearance action may include only one position point, or a set of position points for a generated virtual object to perform an appearance action may include two or more position points.

Figure 7:
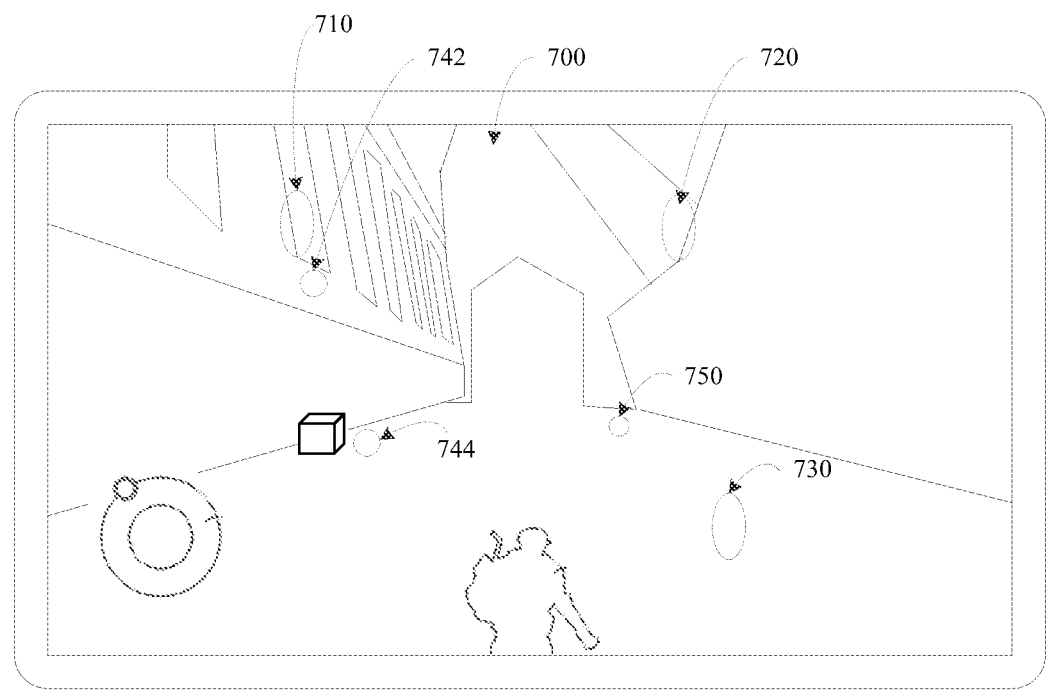
FIG. 7 is a schematic diagram of a correspondence between position points in the embodiment shown in FIG. 5.

For example, one position point for generating a virtual object corresponds to a set of position points for a generated virtual object to perform an appearance action. FIG. 7 is a schematic diagram of a correspondence between position points in an embodiment of this application. As shown in FIG. 7, in a virtual scene 700, position points for generating a virtual object (that is, a position point 710, a position point 720, and a position point 730 in FIG. 7) are preset. A set of position points for a virtual object to perform an appearance action corresponding to the position point 710 includes two position points (that is, a position point 742 and a position point 744 in FIG. 7), a set of position points for a virtual object to perform an appearance action corresponding to the position point 720 includes a single position point 750, and a set of position points for a virtual object to perform an appearance action corresponding to the position point 730 and the position point 730 are the same position point.

In this embodiment of this application, different position points for a generated virtual object to perform an appearance action may alternatively correspond to virtual objects of different object types. When the foregoing first position point corresponds to a plurality of sets of position points for a generated virtual object to perform an appearance action, the terminal may determine, according to the object type of the first virtual object, from the plurality of sets of position points for a generated virtual object to perform an appearance action corresponding to the first position point, a set of position points matching the object type of the first virtual object as second position points. When there are two or more sets of position points that match the object type of the first virtual object in the plurality of sets of position points for a generated virtual object to perform an appearance action corresponding to the first position point, the terminal may determine a set of position points from the two or more sets of position points as second position points according to priorities or refresh probabilities of the two or more sets of position points; or randomly select one of the two or more sets of position points as second position points.

When determining the appearance action of the first virtual object at the second position point, the terminal may determine the appearance action of the first virtual object at the second position point according to the object type of the first virtual object and a position type of the second position point.

In this embodiment of this application, an appearance action may be pre-designed for each virtual object in accordance with its biological features. Each appearance action may match its position type. For example, when the virtual object is an object in the form of a reptile, pre-designed appearance actions for the virtual object may include climbing up, climbing down, climbing out of the ground, and the like. The appearance actions of climbing up or climbing down may correspond to a position type of a steep slope or a wall. The appearance action of climbing out of the ground may correspond to a position type of a horizontal ground.

Figure 8:
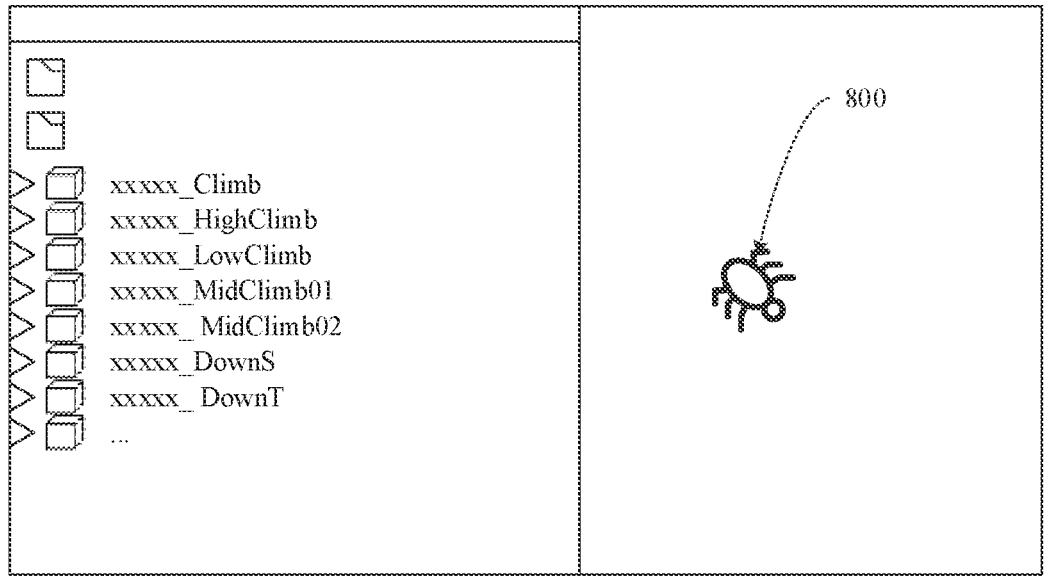
FIG. 8 is a schematic diagram of a configuration file of an appearance action of a virtual object in the embodiment shown in FIG. 5.

For example, FIG. 8 is a schematic diagram of a configuration file of an appearance action of a virtual object in an embodiment of this application. As shown in FIG. 8, a virtual object 800 is a virtual object in the form of a spider, and a developer may preset seven sets of appearance actions that match the form of a spider with reference to biological features of the virtual object 800. The seven sets of appearance actions are as follows:

1) climbing down (normal height), corresponding to an action resource file xxxxx_Climb;
2) climbing down (higher height), corresponding to an action resource file xxxxx_HighClimb;
3) climbing down (lower height), corresponding to an action resource file xxxxx_LowClimb;
4) climbing down (medium height 1), corresponding to an action resource file xxxxx_MidClimb01;
5) climbing down (medium height 2), corresponding to an action resource file xxxxx_MidClimb02;
6) crawling out of the ground_1, corresponding to an action resource file xxxxx_DownS; and
7) crawling out of the ground_2, corresponding to an action resource file xxxxx_DownT.

In this embodiment of this application, for a virtual object, a plurality of sets of appearance actions of the virtual object may correspond to position types of different position points. A correspondence between the appearance action and the position type may be preset by the developer.

Figure 9:
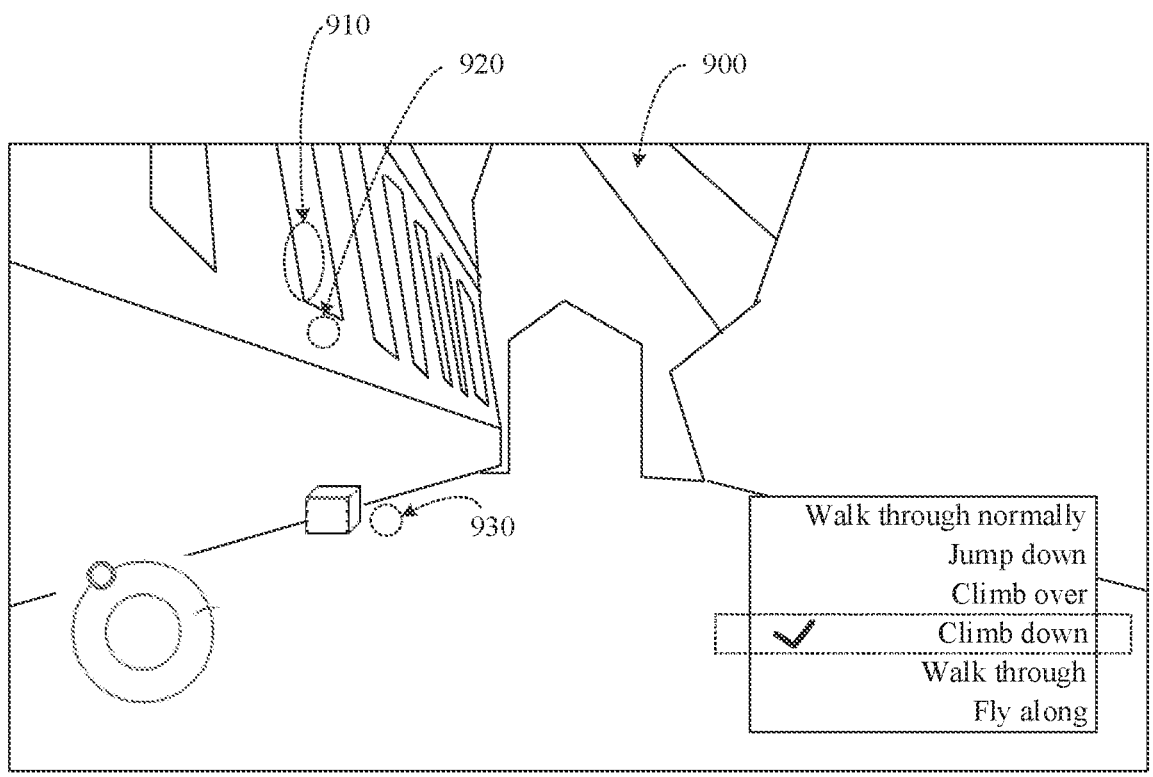
FIG. 9 is a schematic diagram of setting an appearance action corresponding to a position type in the embodiment shown in FIG. 5.

For example, FIG. 9 is a schematic diagram of setting an appearance action corresponding to a position type in an embodiment of this application. As shown in FIG. 9, a developer may preset six types of appearance actions, including:

1) Walking through normally (Normal);
2) Jumping down (JumpDown);
3) Climbing over (ClimbOver);
4) Climbing down (ClimbDown);
5) Walking through (WalkThrough); and
6) Flying along (FlyAlong).

For a set of position points 910 for a virtual object to perform an appearance action in a virtual scene 900, the set of position points 910 includes two position points located on a window and the ground respectively (shown as a position point 920 and a position point 930 in FIG. 9), The developer may set a type of an appearance action corresponding to the position point 910 as climbing down. This type of appearance action may correspond to various appearance actions of climbing down from a high place in FIG. 8.

When determining the appearance action of the first virtual object at the second position point, the terminal may select a matching appearance action with reference to the object type of the virtual object and the position type of the second position point. For example, the virtual object is in the form of a reptile, and the second position point is the horizontal ground. The terminal or the server may determine that the appearance action of the virtual object is crawling out of the ground.

Step 504. Control the first virtual object to move from the first position point to the second position point.

After determining the appearance action, the terminal may control the first virtual object to move from the first position point to the second position point.

When controlling the first virtual object to move from the first position point to the second position point, the terminal may determine a first movement path and a movement manner of the first virtual object moving from the first position point to the second position point according to the object type of the virtual object and a type of a terrain between the first position point and the second position point; and control the first virtual object to move from the first position point to the second position point according to the first movement path and the movement manner.

Step 505. Control the first virtual object to perform h appearance action at the second position point.

After controlling the first virtual object to move from the first position point to the second position point, the terminal may control the first virtual object to perform the determined appearance action at the second position point.

Figure 10:
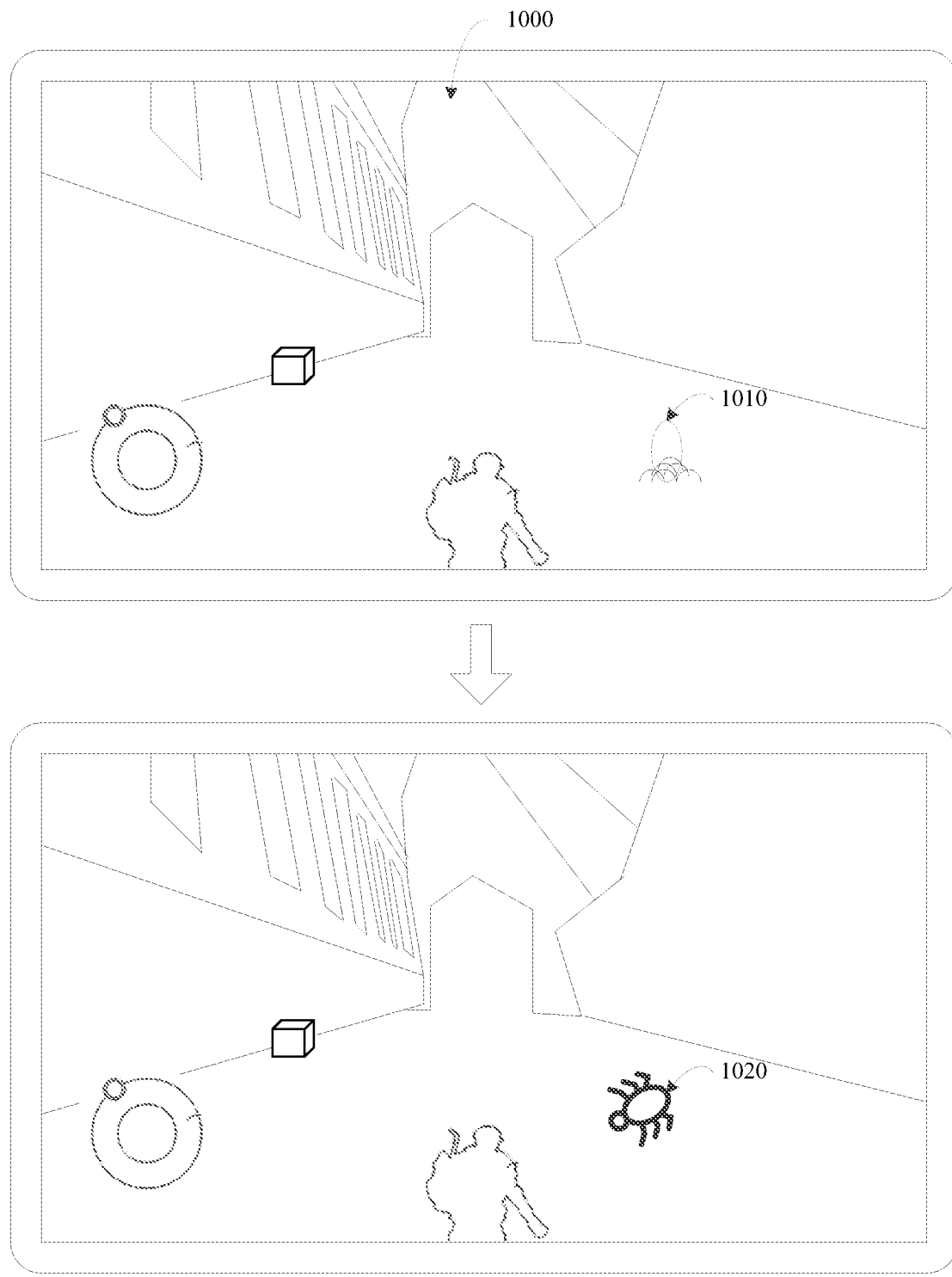
FIG. 10 is a schematic diagram of performing an appearance action in the embodiment shown in FIG. 5.

For example, FIG. 10 is a schematic diagram of performing an appearance action in an embodiment of this application. As shown in FIG. 10, in a virtual scene 1000, the terminal generates a virtual object 1020 at a first position point 1010, and a second position point and the first position point 1010 are the same position point. The terminal determines that an appearance action of the virtual object 1020 is crawling out of the ground. After the virtual object 1020 is generated, the virtual object 1020 is located underground at the first position point 1010. In this case, the terminal controls the virtual object 1020 to climb out of the ground, and picture changes of a process of climbing out of the ground by the virtual object 1020 is shown in FIG. 10.

In a case that the second position point includes at least two position points, and the at least two position points include a start point and an end point, when controlling the first virtual object to perform the appearance action at the second position point, the terminal may determine a second movement path from the start point to the end point according to an action type of the appearance action, the second movement path including the at least two position points; and control the first virtual object to perform the appearance action along the second movement path.

Figure 11:
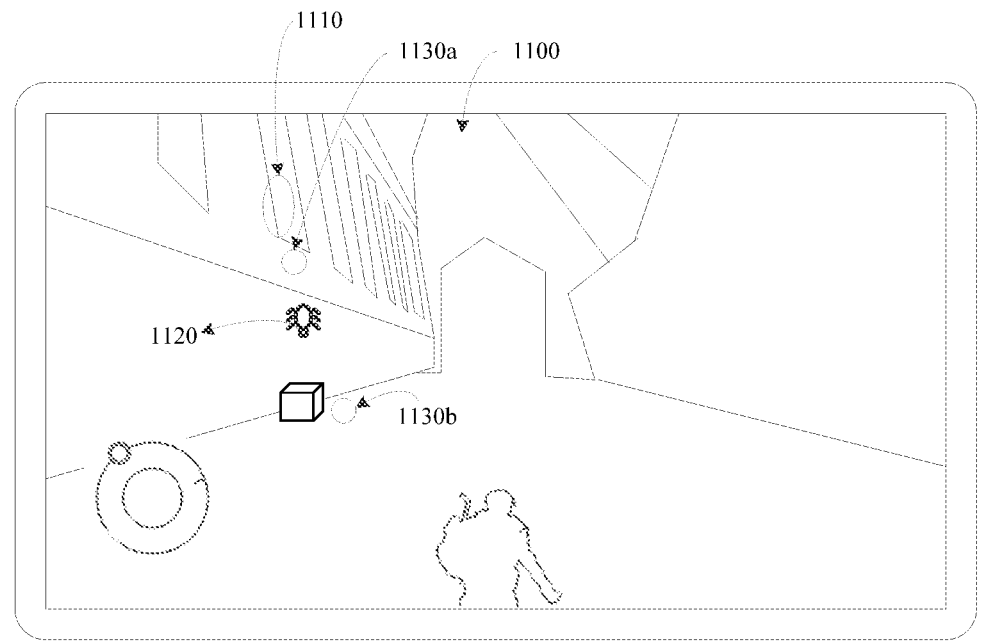
FIG. 11 is a schematic diagram of performing another appearance action in the embodiment shown in FIG. 5.

For example, FIG. 11 is a schematic diagram of performing another appearance action in an embodiment of this application. As shown in FIG. 11, in a virtual scene 1100, the terminal generates a virtual object 1120 at a first position point 1110 (a position of a window sill in FIG. 11), a second position point includes position points 1130*a* and 1130*b*, and the position point 1130*a* is higher than the position point 1130*b*. The terminal determines that the appearance action of the virtual object 1120 is climbing down from a high place. After generating the virtual object 1120, the virtual object 1120 is located at the first position point 1110. In this case, the terminal controls the virtual object 1120 to crawl from the first position point 1110 to the position point 1130*a*, and crawl from the position point 1130*a* to the position point 1130*b* according to the generated path.

Figure 12:
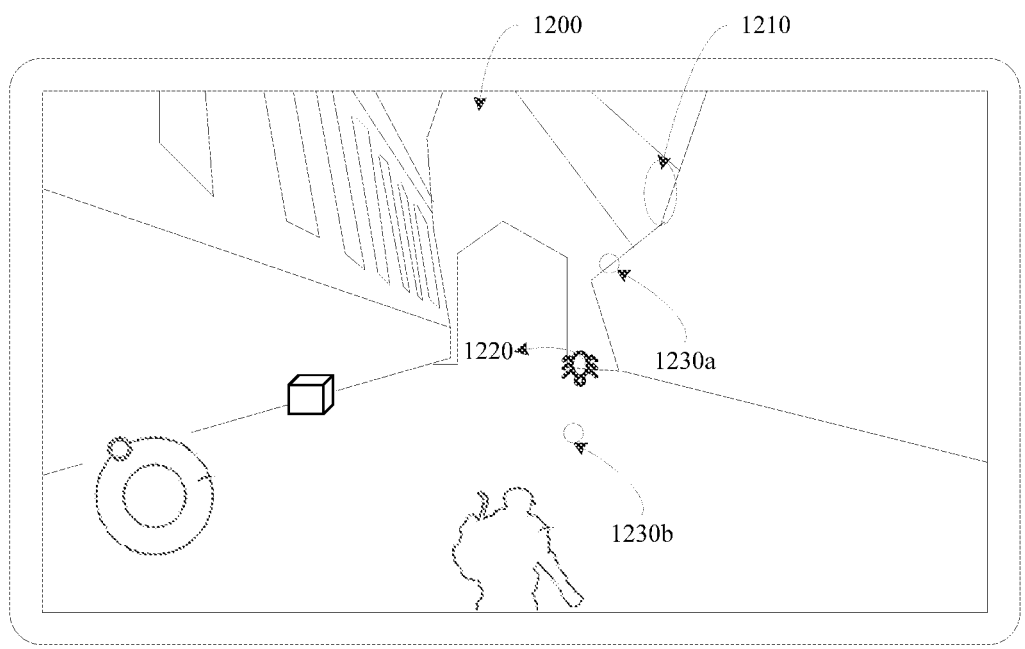
FIG. 12 is a schematic diagram of performing still another appearance action in the embodiment shown in FIG. 5.

Alternatively, FIG. 12 is a schematic diagram of performing still another appearance action in an embodiment of this application. As shown in FIG. 12, in a virtual scene 1200, the terminal generates a virtual object 1220 at a first position point 1210 (a position of a roof in FIG. 12), a second position point includes position points 1230*a* and 1230*b*, and the position point 1230*a* is higher than the position point 1230*b*. The terminal determines that the appearance action of the virtual object 1220 is jumping down from a high place. After generating the virtual object 1220, the virtual object 1220 is located at the first position point 1210. In this case, the terminal controls the virtual object 1220 to walk from the first position point 1210 to the position point 1230*a*, and jump down from the position point 1230*a* to the position point 1230*b*.

The first virtual object is a non-user-controlled object.

In summary, in the solutions shown in the embodiments of this application, when a virtual object needs to be refreshed in a virtual scene, a first virtual object may be generated at a first position point, and the first virtual object is controlled to move to a second position point corresponding to the first position point, and an appearance action is performed at the second position point, so that the first virtual object is refreshed more naturally and more contagiously, thereby improving the refreshing effect of the virtual object.

In addition, in the solutions shown in the embodiments of this application, the appearance action may be determined with reference to the position type of the second position point and the object type of the first virtual object, so that the appearance action of the first virtual object can match an appearance position and biological features of the virtual object, thereby further improving the refreshing effect of the virtual object.

The method for controlling an object in a virtual scene provided in this application may be implemented by the cooperation and interaction between the terminal and the server. For example, when the virtual scene is built by the terminal, and each object in the virtual scene is controlled through the interaction between the terminal and the server, the object control process in the virtual scene may be controlled through the cooperation and interaction between the terminal and the server.

Figure 13:
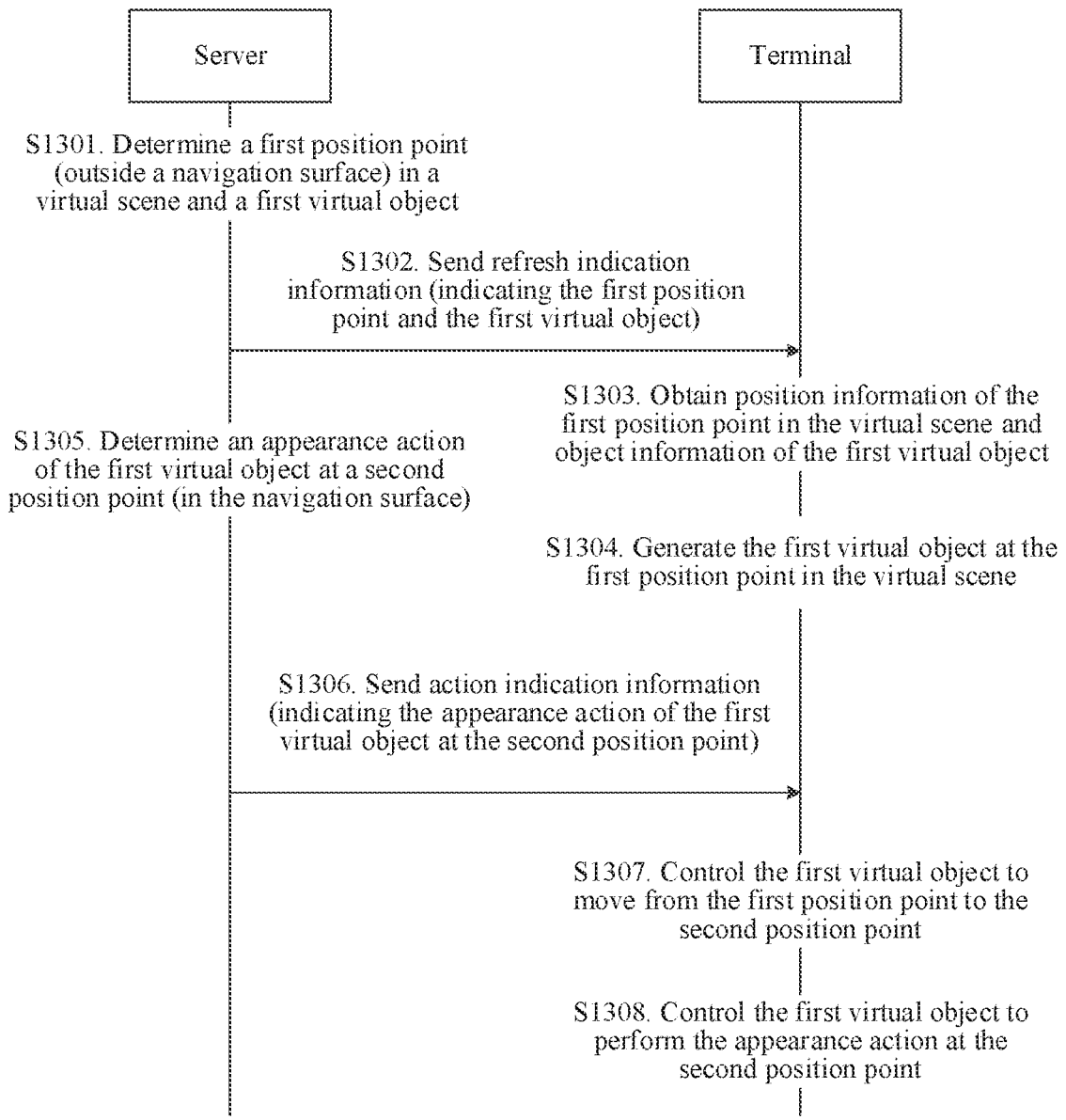
FIG. 13 is a flowchart of a method for controlling an object in a virtual scene according to an exemplary embodiment of this application.

For example, FIG. 13 is a flowchart of a method for controlling an object in a virtual scene according to an exemplary embodiment of this application. For example, the method is implemented by the terminal and the server, and the method for controlling an object in a virtual scene may include the following steps:

Step 1301. The server determines a first virtual object in a virtual scene, and a first position point of the first virtual object outside a navigation surface in the virtual scene.

The step of determining the first position point and the first virtual object by the server is similar to the step of determining the first position point and the first virtual object by the terminal in the embodiment shown in FIG. 5 (that is, the description of step 501), and details are not described herein again.

Step 1302. The server sends refresh indication information to the terminal, the refresh indication information being used for indicating the first position point and the first virtual object, and the terminal receives the refresh indication information.

In this embodiment of this application, after determining the first position point and the first virtual object, the server sends the refresh indication information indicating the first position point and the first virtual object to the terminal.

Step 1303, The terminal obtains position information of the first position point in the virtual scene and object information of the first virtual object according to the refresh indication information.

After receiving the refresh indication information, the terminal may query the position information of the first position point and the object information of the first virtual object from a local database.

Step 1304. The terminal generates the first virtual object at the first position point in the virtual scene.

After obtaining the position information of the first position point in the virtual scene and the object information of the first virtual object, the terminal may generate the first virtual object at the first position point in the virtual scene, and display the first virtual object at the first position point in the virtual scene.

Step 1305. The server determines an appearance action of the first virtual object at a second position point, the second position point being a position point in the navigation surface.

The step of determining the appearance action of the first virtual object at the second position point by the server is similar to the step of determining the appearance action of the first virtual object at the second position point by the terminal in the embodiment shown in FIG. 5 (that is, the description of step 503), and details are not described herein again.

Step 1306. The server sends action indication information to the terminal, the action indication information being used for indicating the appearance action of the first virtual object at the second position point, and the terminal receives the action indication information.

In this embodiment of this application, after the server determines the appearance action of the first virtual object at the second position point, the action indication information is used to indicate the appearance action to the terminal.

Steps 1305 and 1306 and steps 1303 and 1304 may be performed at the same time or sequentially.

Step 1307, The terminal controls the first virtual object to move from the first position point to the second position point.

Step 1308. The terminal controls the first virtual object to perform the appearance action at the second position point.

For a specific implementation process of steps 1307 and 1308, refer to the description of steps 504 and 505 in the embodiment of FIG. 5, and details are not described herein again.

In summary, in the solutions shown in the embodiments of this application, when a virtual object needs to be refreshed in a virtual scene, a first virtual object may be generated at a first position point outside a navigation surface, and the first virtual object is controlled to move to a second position point that corresponds to the first position point and that is in the navigation surface, and an appearance action is performed at the second position point, so that the first virtual object is refreshed more naturally and more contagiously, thereby improving the refreshing effect of the virtual object.

In addition, in the solutions shown in the embodiments of this application, the appearance action may be determined with reference to the position type of the second position point and the object type of the first virtual object, so that the appearance action of the first virtual object can match an appearance position and biological features of the virtual object, thereby further improving the refreshing effect of the virtual object.

For example, the foregoing solution is used to refresh a non-player character (NPC) in a game scene. Through the foregoing solution, special ways to appear (that is, appearance actions) may be designed based on biological features of various NPCs, then the scene is modified with reference to biological habits and behavior features in reality, and designed animal behaviors are combined into the scene for matching and refreshing, thereby bringing more infectious NPC appearances.

Figure 14:
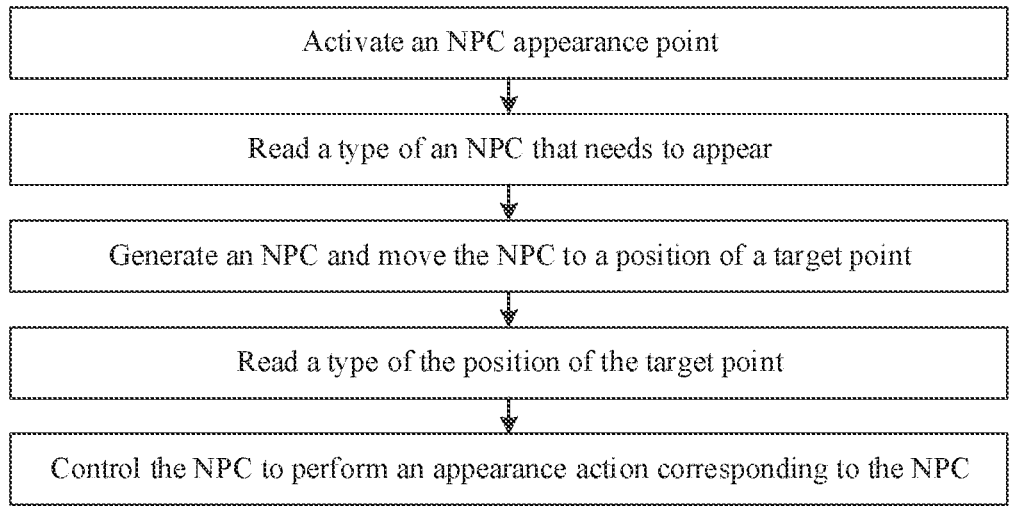
FIG. 14 is a schematic diagram of a refresh process according to an exemplary embodiment of this application.

Specifically, FIG. 14 is a schematic diagram of a refresh process according to an exemplary embodiment of this application. As shown in FIG. 14, a game developer may make N sets of appearance actions based on biological features of NPCs, including "appearing from a high place", "appearing over a wall", "climbing out of the ground", and the like. An appearance action is selected according to the situation of an appearance point (that is, the foregoing first position point) at the time of appearance. In the game scene, "NPC appearance point" and "associated target point" (that is, the foregoing second position point, corresponding to a "associated target point type such as a high place, underground, and behind a wall") may be configured according to the scene situation. When an NPC appearance point is activated, the terminal may read a type of NPC that needs to appear, and generate a corresponding NPC at the NPC appearance point. After appearing at the appearance point, the NPC will move to a position of a corresponding target point. The terminal may read a position type of the target point, determine an appearance action corresponding to the NPC with reference to the NPC type and the position type of the target point, and control the NPC to perform the appearance action at the position of the target point.

Figure 15:
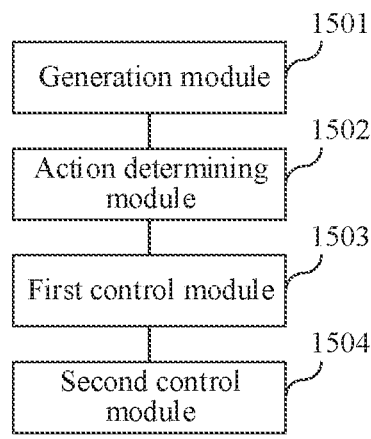
FIG. 15 is a structural block diagram of an apparatus for controlling an object a virtual scene according to an exemplary embodiment of this application.

FIG. 15 is a structural block diagram of an apparatus for controlling an object ina virtual scene according to an exemplary embodiment of this application. The apparatus for controlling an object in a virtual scene may be used in a terminal to perform all or some of the steps performed by the terminal in the method shown in any one of the embodiments of FIG. 3, FIG. 5, or FIG. 13. The apparatus for controlling an object in a virtual scene may include:

a generation module 1501, configured to generate a first virtual object at a first position point in a virtual scene, the first position point being located outside a navigation surface of the first virtual object in the virtual scene, and the navigation surface being a way-finding surface on which the first virtual object moves to a position of a user-controlled object in the virtual scene;

an action determining module 1502, configured to determine an appearance action of the first virtual object at a second position point, the second position point being located in the navigation surface;

a first control module 1503, configured to control the first virtual object to move from e first position point to the second position point; and a second control module 1504, configured to control the first virtual object to perform the appearance action at the second position point.

The apparatus further includes:

a first object determining module, configured to: before the generation module 1501 generates the first virtual object at the first position point in the virtual scene, determine the first virtual object corresponding to the virtual scene; and a first position point determining module, configured to determine the first position point corresponding to an object type of the first virtual object.

The position point determining module is specifically configured to:

obtain a position of a second virtual object in the virtual scene, the second virtual object being the user-controlled object; and determine a set of candidate positions according to the position of the second virtual object in the virtual scene, the set of candidate positions including at least one position point; and determine the first position point corresponding to the object type of the first virtual object in the set of candidate positions.

When determining the set of candidate positions according to the position of the second virtual object in the virtual scene, the position point determining module is specifically configured to add each position point that is within a preset range around the position of the second virtual object in the virtual scene and is used for generating a virtual object to the set of candidate positions.

In a case that there are two or more position points that correspond to the object type of the first virtual object in the set of candidate positions, when determining the first position point corresponding to the object type of the first virtual object in the set of candidate positions, the position point determining module is specifically configured to:

determine a position point closest to the second virtual object in the two or more position points as the first position point;

determine a position point farthest from the second virtual object in the two or more position points as the first position point; or determine a random one of the two or more position points as the first position point.

The apparatus further includes:

a second position point determining module; configured to: before the generation module 1501 generates the first virtual object at the first position point in the virtual scene, determine the first position point in the virtual scene; and a second object determining module, configured to determine the first virtual object corresponding to a position type of the first position point.

The second position point determining module is specifically configured to:

obtain a position of a second virtual object in the virtual scene, the second virtual object being the user-controlled object; and determine the first position point according to the position of the second virtual object in the virtual scene.

The apparatus further includes:

a first receiving module, configured to: before the generation module 1501 generates the first virtual object at the first position point in the virtual scene, receive refresh indication information transmitted by a server, the refresh indication information being used for indicating the first position point and the first virtual object.

The action determining module 1502 is specifically configured to determine the appearance action of the first virtual object at the second position point according to an object type of the first virtual object and a position type of the second position point.

The action determining module 1502 is specifically configured to receive action indication information transmitted by the server, the action indication information being used for indicating the appearance action of the first virtual object at the second position point.

The first control module 1503 is specifically configured to:

determine a first movement path and a movement manner of the first virtual object moving from the first position point to the second position point according to the object type of the first virtual object and a type of a terrain between the first position point and the second position point; and control the first virtual object to move from the first position point to the second position point according to the first movement path and the movement manner.

The second position point includes at least two position points, and the at least two position points include a start point and an end point. The second control module 1504 is specifically configured to:

determine a second movement path from the start point to the end point according to an action type of the appearance action, the second movement path including the at least two position points; and control the first virtual object to perform the appearance action along the second movement path.

The foregoing embodiments of this application are described by using an example in which the first position point is located outside the navigation surface of the first virtual object in the virtual scene. In practical applications, the first position point may alternatively be located in the navigation surface of the first virtual object in the virtual scene. When the first position point is located in the navigation surface of the first virtual object in the virtual scene, a way of controlling the first virtual object to appear in the virtual scene is similar to the solutions disclosed in the foregoing embodiments, and details are not described herein again.

Figure 16:
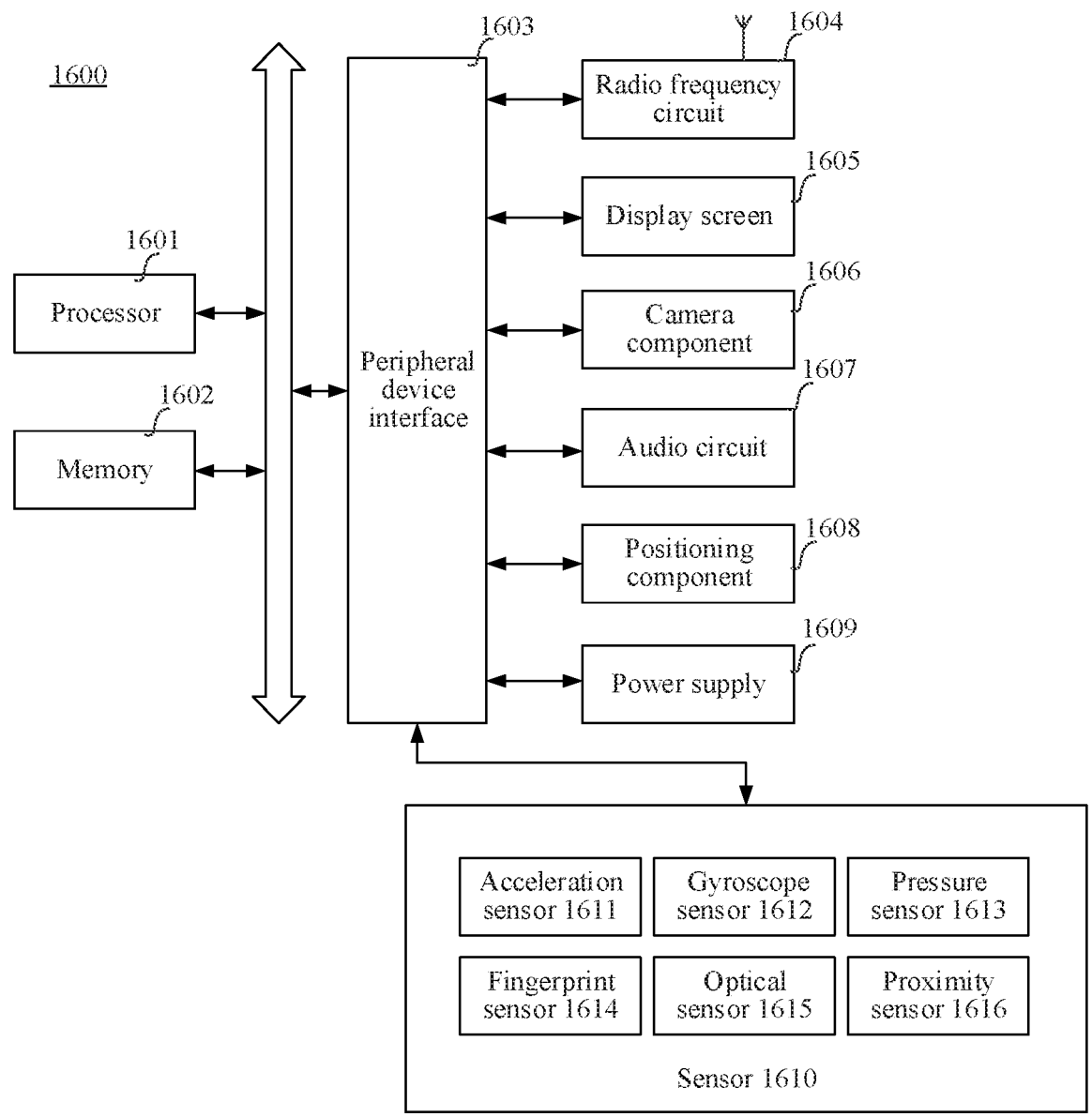
FIG. 16 is a structural block diagram of a computer device according to an exemplary embodiment of this application.

FIG. 16 is a structural block diagram of a computer device 1600 according to an exemplary embodiment. The computer device 1600 may be a user terminal, for example, a smartphone, a tablet computer, a moving picture experts group audio layer III (MP3) player, a moving picture experts group audio layer IV (MP4) player, a notebook computer, or a desktop computer. The computer device 1600 may alternatively be referred to as another name such as user equipment, a portable terminal, a laptop terminal, or a desktop terminal.

Generally, the computer device 1600 includes a processor 1601 and a memory 1602.

The processor 1601 includes one or more processing cores, for example, a 4-core processor or an 8-core processor. The processor 1601 may be implemented by at least one hardware form of a digital signal processor (DSP), a field-programmable gate array (FPGA), and a programmable logic array (PLA). The processor 1601 may alternatively include a main processor and a coprocessor. The main processor is configured to process data in an awake state, also referred to as a central processing unit (CPU), and the coprocessor is a low-power processor configured to process data in an idle state. In some embodiments, the processor 1601 may be integrated with a graphics processing unit (GPU), The GPU is responsible for rendering and drawing content to be displayed by a display screen. In some embodiments, the processor 1601 may further include an artificial intelligence (AI) processor. The AI processor is configured to process a calculation operation related to machine learning.

The memory 1602 may include one or more computer-readable storage media. The computer-readable storage media may be non-transient. The memory 1602 may further include a high-speed random access memory, and a non-volatile memory such as one or more magnetic disk storage devices and a flash memory device. In some embodiments, the non-transient computer-readable storage medium in the memory 1602 is configured to store at least one instruction. The at least one instruction is executed by the processor 1601 to perform the method for controlling an object in a virtual scene provided in the method embodiment of this application.

In some embodiments, the computer device 1600 may further include a peripheral device interface 1603 and at least one peripheral device. The processor 1601, the memory 1602, and the peripheral device interface 1603 may be connected through a bus or a signal cable. Each peripheral device may be connected to the peripheral device interface 1603 through a bus, a signal cable, or a circuit board. Specifically, the peripheral device may include at least one of a radio frequency (RF) circuit 1604, a touch display screen 1605, a camera component 1606, an audio circuit 1607, a positioning component 1608, and a power supply 1609.

The peripheral device interface 1603 may be configured to connect at least one peripheral device related to input/output (I/O) to the processor 1601 and the memory 1602. In some embodiments, the processor 1601, the memory 1602, and the peripheral device interface 1603 are integrated into the same chip or circuit board. In some other embodiments, any one or two of the processor 1601, the memory 1602, and the peripheral device interface 1603 may be implemented on an independent chip or circuit board, and the implementation is not limited in this embodiment.

The radio frequency circuit 1604 is configured to receive and transmit a radio frequency (RF) signal, also referred to as an electromagnetic signal. The radio frequency circuit 1604 communicates with a communications network and another communications device by using the electromagnetic signal. The radio frequency circuit 1604 may convert an electrical signal into an electromagnetic signal for transmission, or convert a received electromagnetic signal into an electrical signal. The radio frequency circuit 1604 includes an antenna system, an RF transceiver, one or more amplifiers, a tuner, an oscillator, a digital signal processor, a codec chip set, a subscriber identity module card, and the like. The radio frequency circuit 1604 may communicate with another terminal by using a wireless communications protocol. The wireless communications protocol includes, but is not limited to, the World Wide Web, a metropolitan area network, an intranet, generations of mobile communications networks (2G, 3G, 4G, and 5G), a wireless local area network, and/or a wireless fidelity (Wi-Fi) network. In some embodiments, the radio frequency circuit 1604 may further include a near field communication (NFC) related circuit, and is not limited in this application.

The display screen 1605 is configured to display a user interface (UI). The UI may include a graph, text, an icon, a video, and any combination thereof. In a case that the display screen 1605 is a touch display screen, the display screen 1605 is further capable of collecting a touch signal on or over a surface of the display screen 1605. The touch signal may be inputted into the processor 1601 as a control signal for processing. In this case, the display screen 1605 may be further configured to provide a virtual button and/or a virtual keyboard, also referred to as a soft button and/or a soft keyboard. In some embodiments, there is one display screen 1605, disposed on a front panel of the computer device 1600. In some other embodiments, there may be two display screens 1605, respectively disposed on different surfaces of the computer device 1600 or designed in a foldable shape. In still some other embodiments, the display screen 1605 may be a flexible display screen, disposed on a curved surface or a folded surface of the computer device 1600. Even, the display screen 1605 may be further set to have a non-rectangular irregular graph, that is, a special-shaped screen. The display screen 1605 may be manufactured by using a material such as a liquid crystal display (LCD), an organic light-emitting diode (OLED), or the like.

The camera component 1606 is configured to collect an image or a video. The camera component 1606 includes a front-facing camera and a rear-facing camera. Generally, the front-facing camera is disposed on the front panel of the terminal, and the rear-facing camera is disposed on a back face of the terminal. In some embodiments, there are at least two rear-facing cameras, each being any one of a main camera, a depth of field camera, a wide-angle camera, and a telephoto camera, to implement a Bokeh function through fusion of the main camera and the depth of field camera, panoramic photo shooting and virtual reality (VR) shooting functions through fusion of the main camera and wide-angle camera, or another fusion shooting function. In some embodiments, the camera component 1606 may further include a flash. The flash may be a monochrome temperature flash, or may be a double color temperature flash. The double color temperature flash refers to a combination of a warm flash and a cold flash, and may be configured to perform light ray compensation at different color temperatures.

The audio circuit 1607 may include a microphone and a speaker. The speaker is configured to collect sound waves of a user and an environment, and convert the sound waves into electrical signals and input the electrical signals into the processor 1601 for processing, or input the electrical signals into the radio frequency circuit 1604 to implement voice communication. For the purpose of stereo sound collection or noise reduction, there may be a plurality of microphones, respectively disposed at different parts of the computer device 1600. The microphone may be further a microphone array or an omni-directional microphone. The speaker is configured to convert electrical signals from the processor 1601 or the radio frequency circuit 1604 into sound waves. The speaker may be a conventional thin-film speaker or a piezoelectric ceramic speaker. When the speaker is the piezoelectric ceramic speaker, electrical signals not only can be converted into sound waves that can be heard by humans, but also can be converted into sound waves that cannot be heard by humans for ranging and the like. In some embodiments, the audio circuit 1607 may further include an earphone jack.

The positioning component 1608 is configured to locate a current geographic location of the computer device 1600, to implement a navigation or a location based service (LBS). The positioning component 1608 may be a positioning component based on the global positioning system (GPS) of the United States, the BeiDou navigation satellite system of China, or the Galileo system of Russia.

The power supply 1609 is configured to supply power to components in the computer device 1600. The power supply 1609 may be an alternating current, a direct current, a primary battery, or a rechargeable battery. In a case that the power supply 1609 includes the rechargeable battery, the rechargeable battery may be a wired charging battery or a wireless charging battery. The wired charging battery is a battery charged through a wired line, and the wireless charging battery is a battery charged through a wireless coil. The rechargeable battery may be further configured to support a quick charge technology.

In some embodiments, the computer device 1600 further includes one or more sensors 1610. The one or more sensors 1610 include, but are not limited to, an acceleration sensor 1611, a gyroscope sensor 1612, a pressure sensor 1613, a fingerprint sensor 1614, an optical sensor 1615, and a proximity sensor 1616.

The acceleration sensor 1611 may detect acceleration on three coordinate axes of a coordinate system established by the computer device 1600. For example, the acceleration sensor 1611 may be configured to detect components of gravity acceleration on the three coordinate axes. The processor 1601 may control, according to a gravity acceleration signal collected by the acceleration sensor 1611, the display screen 1605 to display the user interface in a frame view or a portrait view. The acceleration sensor 1611 may be further configured to collect motion data of a game or a user.

The gyroscope sensor 1612 may detect a body direction and a rotation angle of the computer device 1600. The gyroscope sensor 1612 may cooperate with the acceleration sensor 1611 to collect a 3D action by the user on the computer device 1600. The processor 1601 may implement the following functions according to data collected by the gyroscope sensor 1612: motion sensing (for example, the UI is changed according to a tilt operation of the user), image stabilization during shooting, game control, and inertial navigation.

The pressure sensor 1613 may be disposed on a side frame of the computer device 1600 and/or a lower layer of the touch display screen 1605. In a case that the pressure sensor 1613 is disposed on the side frame of the computer device 1600, a holding signal of the user on the computer device 1600 may be detected. The processor 1601 performs left and right hand recognition or a quick operation according to the holding signal collected by the pressure sensor 1613. In a case that the pressure sensor 1613 is disposed on the low layer of the display screen 1605, the processor 1601 controls, according to a pressure operation of the user on the display screen 1605, an operable control on the UI. The operable control includes at least one of a button control, a scroll bar control, an icon control, and a menu control.

The fingerprint sensor 1614 is configured to collect a fingerprint of the user. The processor 1601 identifies an identity of the user according to the fingerprint collected by the fingerprint sensor 1614, or the fingerprint sensor 1614 identifies an identity of the user according to the collected fingerprint. In a case that the identity of the user is identified as a trusted identity, the processor 1601 authorizes the user to perform a related sensitive operation. The sensitive operation includes unlocking a screen, viewing encrypted information, downloading software, payment, changing settings, and the like. The fingerprint sensor 1614 may be disposed on a front face, a back face, or a side face of the computer device 1600. In a case that a physical button or a vendor logo is disposed on the computer device 1600, the fingerprint sensor 1614 may be integrated together with the physical button or the vendor logo.

The optical sensor 1615 is configured to collect ambient light intensity. In an embodiment, the processor 1601 may control display luminance of the display screen 1605 according to the ambient light intensity collected by the optical sensor 1615. Specifically, in a case that the ambient light intensity is relatively high, the display luminance of the display screen 1605 is increased. In a case that the ambient light intensity is relatively low, the display luminance of the display screen 1605 is reduced. In another embodiment, the processor 1601 may further dynamically adjust shooting parameters of the camera component 1606 according to the ambient light intensity collected by the optical sensor 1615.

The proximity sensor 1616, also referred to as a distance sensor, is usually disposed on the front panel of the computer device 1600. The proximity sensor 1616 is configured to collect a distance between a front face of the user and the front face of the computer device 1600. In an embodiment, in a case that the proximity sensor 1616 detects that the distance between the front face of the user and the front face of the computer device 1600 is gradually decreased, the processor 1601 controls the touch display screen 1605 to switch from a screen-on state to a screen-off state. In a case that the proximity sensor 1616 detects that the distance between the front face of the user and the front face of the computer device 1600 is gradually increased, the processor 1601 controls the touch display screen 1605 to switch from the screen-off state to the screen-on state.

A person skilled in the art may understand that a structure shown in FIG. 16 constitutes no limitation on the computer device 1600, and the electronic device may include more or fewer components than those shown in the figure, or some components may be combined, or a different component deployment may be used.

In an exemplary embodiment, a non-temporary computer-readable storage medium including an instruction is further provided. For example, the non-temporary computer-readable storage medium includes at least one instruction, at least one program, a code set, or an instruction set. The at least one instruction, the at least one program, the code set, or the instruction set may be executed by a processor to implement all or some steps in the method shown in any one of the foregoing embodiments of FIG. 3, FIG. 5, and FIG. 13. For example, the non-temporary computer-readable storage medium may be a ROM, a random access memory (RAM), a CD-ROM, a magnetic tape, a floppy disk, an optical data storage device, or the like.

After considering the specification and implementing the present disclosure, a person skilled in the art can readily think of other implementations of this application. This application is intended to cover any variation, use, or adaptive change of this application. These variations, uses, or adaptive changes follow the general principles of this application and include common general knowledge or common technical means in the art that are not disclosed in this application. The specification and the embodiments are considered as merely exemplary, and the real scope and spirit of this application are pointed out in the following claims.

It is to be understood that this application is not limited to the precise structures described above and shown in the accompanying drawings, and various modifications and changes can be made without departing from the scope of this application. The scope of this application is subject only to the appended claims.

What is claimed is:

1. A method, performed by a terminal device, for controlling an object in a virtual scene comprising:

determining a first position point in the virtual scene, the first position point being located outside a navigation surface of a first virtual object in the virtual scene, and the navigation surface being a way-finding surface on which the first virtual object moves to a position of a user-controlled object in the virtual scene;

determining a plurality of movement types suitable for moving on a terrain at the first position point;

selecting a movement type from the plurality of movement types as a target movement type based on preset movement type selection criteria;

determining a plurality of virtual objects that are able to be generated at the first position point and move with the target movement type;

selecting a virtual object from the plurality of virtual objects as the first virtual object based on preset virtual object selection criteria;

generating the first virtual object at the first position point in the virtual scene;

determining an appearance action of the first virtual object at a second position point according to the target movement type of the first virtual object and a terrain at the second position point, the second position point being located in the navigation surface;

determining a first movement path and a movement manner of the first virtual object moving from the first position point to the second position point according to the target movement type of the first virtual object and a terrain between the first position point and the second position point;

controlling the first virtual object to move from the first position point to the second position point according to the first movement path and the movement manner; and controlling the first virtual object to perform the appearance action at the second position point.

2. The method of claim 1, wherein the selecting the virtual object from the plurality of virtual objects as the first virtual object comprises:

determining one of the plurality of virtual objects as the first virtual object according to a preset priority or a refresh probability of each of the plurality of virtual objects.

3. The method of claim 1, wherein the selecting the virtual object from the plurality of virtual objects as the first virtual object comprises:

determining a random one of the plurality of virtual objects as the first virtual object.

4. The method of claim 1, wherein before generating the first virtual object at the first position point in the virtual scene, the method further comprises:

receiving refresh indication information transmitted by a server, the refresh indication information being used for indicating the first position point and the first virtual object.

5. The method of claim 1, wherein determining the appearance action of the first virtual object at the second position point comprises:

receiving action indication information transmitted by a server, the action indication information being used for indicating the appearance action of the first virtual object at the second position point.

6. The method of claim 1, wherein:

controlling the first virtual object to perform the appearance action at the second position point further comprises:

determining a second movement path moving from the second position point to a third position point according to an action type of the appearance action; and controlling the first virtual object to continue performing the appearance action along the second movement path.

7. The method of claim 1, wherein the first virtual object is a non-user-controlled object.

8. An apparatus for controlling an object in a virtual scene, comprising:

a memory operable to store program code;

and a processor operable to read the program code and perform a plurality of operations including:

determining a first position point in the virtual scene, the first position point being located outside a navigation surface of a first virtual object in the virtual scene, and the navigation surface being a way-finding surface on which the first virtual object moves to a position of a user-controlled object in the virtual scene;

determining a plurality of movement types suitable for moving on a terrain at the first position point;

selecting a movement type from the plurality of movement types as a target movement type based on preset movement type selection criteria;

determining a plurality of virtual objects that are able to be generated at the first position point and move with the target movement type;

selecting a virtual object from the plurality of virtual objects as the first virtual object based on preset virtual object selection criteria;

generating the first virtual object at the first position point in the virtual scene;

determining an appearance action of the first virtual object at a second position point according to the target movement type of the first virtual object and a terrain at the second position point, the second position point being located in the navigation surface;

determining a first movement path and a movement manner of the first virtual object moving from the first position point to the second position point according to the target movement type of the first virtual object and a terrain between the first position point and the second position point;

controlling the first virtual object to move from the first position point to the second position point according to the first movement path and the movement manner; and controlling the first virtual object to perform the appearance action at the second position point.

9. A product including:

machine-readable media other than a transitory signal;

and instructions stored on the machine-readable media, the instructions configured to, when executed, cause a machine to:

determine a first position point in a virtual scene, the first position point being located outside a navigation surface of a first virtual object in the virtual scene, and the navigation surface being a way-finding surface on which the first virtual object moves to a position of a user-controlled object in the virtual scene;

determine a plurality of movement types suitable for moving on a terrain at the first position point;

select a movement type from the plurality of movement types as a target movement type based on preset movement type selection criteria;

determine a plurality of virtual objects that are able to be generated at the first position point and move with the target movement type;

select a virtual object from the plurality of virtual objects as the first virtual object based on preset virtual object selection criteria;

generate the first virtual object at the first position point in the virtual scene;

determine an appearance action of the first virtual object at a second position point according to the target movement type of the first virtual object and a terrain at the second position point, the second position point being located in the navigation surface;

determine a first movement path and a movement manner of the first virtual object moving from the first position point to the second position point according to the target movement type of the first virtual object and a terrain between the first position point and the second position point;

control the first virtual object to move from the first position point to the second position point according to the first movement path and the movement manner;

and control the first virtual object to perform the appearance action at the second position point.

* * * * *